United States Patent
Lu

(10) Patent No.: US 9,664,918 B2
(45) Date of Patent: May 30, 2017

(54) DEPTH-FUSED THREE DIMENSIONAL DISPLAY DEVICE

(75) Inventor: Haifeng Lu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 589 days.

(21) Appl. No.: 13/424,740

(22) Filed: Mar. 20, 2012

(65) Prior Publication Data

US 2012/0243087 A1 Sep. 27, 2012

(30) Foreign Application Priority Data

Mar. 23, 2011 (CN) .......................... 2011 1 0070953

(51) Int. Cl.
*G02B 27/22* (2006.01)
*G02B 27/26* (2006.01)
*H04N 13/04* (2006.01)

(52) U.S. Cl.
CPC ......... *G02B 27/26* (2013.01); *G02B 27/2221* (2013.01); *H04N 13/0488* (2013.01)

(58) Field of Classification Search
CPC .............. G02B 27/22; G02B 27/26; G02B 5/30–5/3025; G02B 27/2214; G02B 27/2221; G02B 27/2235; G02B 27/225; G02B 27/2278; G02B 27/28; G02B 27/281; G02B 27/286; H04N 13/04–13/0411; H04N 13/0443; H04N 13/0488–13/049; H04N 13/0495–13/0497; G09G 3/36; G09G 5/00; G02F 1/133; H01L 27/32–27/3202; H01L 27/3209; H01L 27/3267; H01L 27/3286; B32B 2457/20–2457/206
See application file for complete search history.

(56) References Cited

U.S. PATENT DOCUMENTS

2004/0135499 A1* 7/2004 Cok ............................... 313/506
2008/0218067 A1* 9/2008 Lee et al. ..................... 313/504
(Continued)

FOREIGN PATENT DOCUMENTS

| CN | 101510409 A | 8/2009 |
|---|---|---|
| CN | 101557536 A | 10/2009 |
| CN | 201440192 U | 4/2010 |

(Continued)

OTHER PUBLICATIONS

First Chinese Office Action dated Sep. 12, 2013; Appln. No. 201110124633.X.

*Primary Examiner* — Jade R Chwasz
*Assistant Examiner* — Jyotsna Dabbi
(74) *Attorney, Agent, or Firm* — Ladas & Parry LLP

(57) ABSTRACT

A depth-fused 3D (DFD) display device, including: a first display panel and a second display panel which are provided in parallel with each other and separated with a field depth in between; and a circular polarizer, provided between the first display panel and the second display panel. The first display panel is a transparent organic light-emitting display panel and used to display a foreground image, the second display panel is used to display a background image, the second display panel has at least one light-emitting surface which faces the first display panel, and a forward direction of the circular polarizer coincides with the direction from the first display panel to the second display panel.

3 Claims, 2 Drawing Sheets

(56) References Cited

U.S. PATENT DOCUMENTS

2009/0135090 A1* 5/2009 Kim ................................ 345/6
2011/0037836 A1* 2/2011 Chang ............................ 348/52

FOREIGN PATENT DOCUMENTS

| JP | 3-739348 B2 | 11/2005 | | |
|---|---|---|---|---|
| JP | 4-012136 B2 | 9/2007 | | |
| WO | WO2012001597 A1 * | 1/2012 | ............ | G02B 27/22 |

* cited by examiner

DEPTH-FUSED THREE DIMENSIONAL DISPLAY DEVICE

BACKGROUND

Embodiments of the disclosed technology relate to a depth-fused three dimensional (DFD) display device.

With the development of technologies, two-dimensional (2D) display can no longer meet the increasing demand on viewing experience of viewers, and three dimensional (3D) and more dimensional display have become a research focus in the field. Currently, the 3D display technologies can be mainly divided into two categories, i.e., the stereoscopic type in which a viewer need wear a set of glasses with special functions, and the auto-stereoscopic type in which the 3D image can be viewed with bare eyes directly.

A depth-fused three dimensional (DFD) display device is proposed in a Chinese patent application (CN201440192U). As shown in FIG. 1, the DFD display device comprises three parts: a first display panel 110, a second display panel 120 and a cold cathode fluorescence lamp 130. A field depth D is provided between the first display panel 110 and the second display panel 120. The first display panel 110 is used to display a foreground image and the second panel 120 is used to display a background image. In this way, a stereoscopic image can be viewed by the viewer, and this technology can be called DFD display technology.

Each of the first and second display panels as shown in FIG. 1 is a liquid crystal display (LCD) panel. During displaying, the first and second display panels have to display in a time-division manner, i.e., when the first display panel 110 displays a foreground image, the second display panel 120 is in a white state so that the light from the cold cathode fluorescence lamp can pass therethrough and be irradiated on the first display panel 110 as a back light; when the second display panel 120 displays a corresponding background image, the first display panel 110 is in a white state so that the image light from the second display panel 120 can pass therethrough and the background image can be viewed by the viewer in front of the display device. In such an operation state, the light utilization ratio will be decreased by one half, and a synchronization controller has to be provided. Thus, the structure of the display device becomes complex and easy to give rise to malfunction. In addition, the light transmissivity of the liquid crystal panel is very low, e.g., about 5%. When the two liquid crystal display panels are stacked side by side with each other, only a little part of the light from the light source 130 can reach the viewer's eyes, which leads to a very low light utilization ratio.

SUMMARY

An embodiment of the disclosed technology provides a depth-fused 3D (DFD) display device, comprising: a first display panel and a second display panel which are provided in parallel with each other and separated with a field depth therebetween; and a circular polarizer, provided between the first display panel and the second display panel, wherein the first display panel is a transparent organic light-emitting display panel and used to display a foreground image, the second display panel is used to display a background image, the second display panel has at least one light-emitting surface which faces the first display panel, and a forward direction of the circular polarizer coincides with the direction from the first display panel to the second display panel.

Further scope of applicability of the disclosed technology will become apparent from the detailed description given hereinafter. However, it should be understood that the detailed description and specific examples, while indicating preferred embodiments of the disclosed technology, are given by way of illustration only, since various changes and modifications within the spirit and scope of the disclosed technology will become apparent to those skilled in the art from the following detailed description.

BRIEF DESCRIPTION OF THE DRAWINGS

The disclosed technology will become more fully understood from the detailed description given hereinafter and the accompanying drawings which are given by way of illustration only, and thus are not limitative of the disclosed technology and wherein.

DETAILED DESCRIPTION

Embodiments of the disclosed technology now will be described more clearly and fully hereinafter with reference to the accompanying drawings, in which the embodiments of the disclosed technology are shown. Apparently, only some embodiments of the disclosed technology, but not all of embodiments, are set forth here, and the disclosed technology may be embodied in other forms. All of other embodiments made by those skilled in the art based on embodiments disclosed herein without mental work fall within the scope of the disclosed technology.

Figure 1:
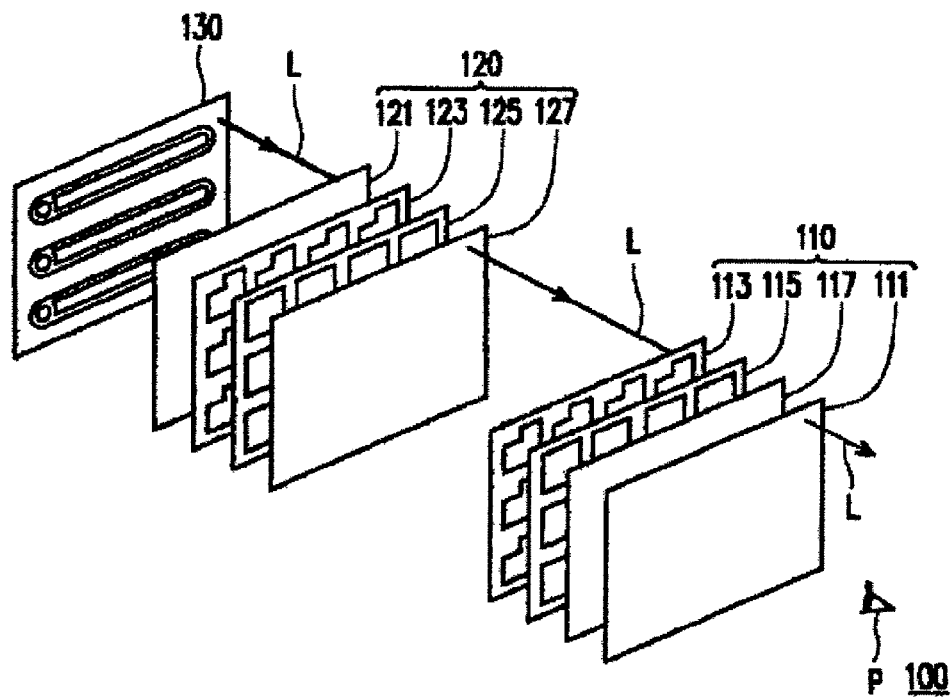
FIG. 1 is a structural schematic view of a conventional Depth-Fused 3D (DFD) display.
Figure 2:
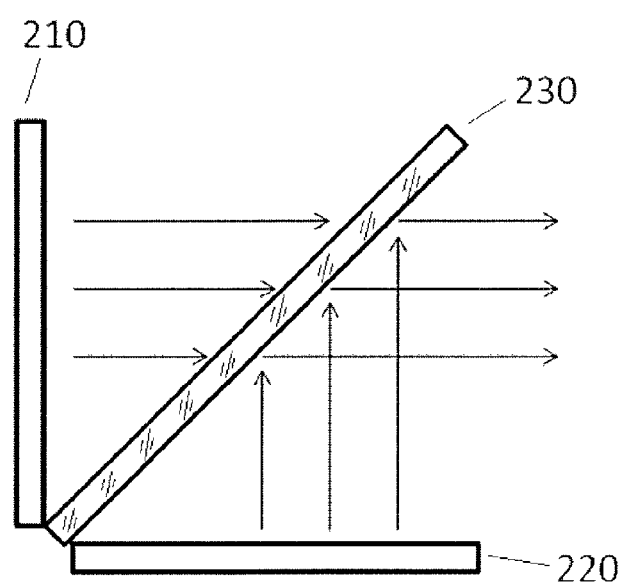
FIG. 2 is a structural schematic view of an improved DFD display.

In order to address the problem of low light utilization ratio in the structure as shown in FIG. 1, a 3D display device is proposed as shown in FIG. 2. The display device comprises a first display panel 210 used to display a foreground image, a second display panel 220 used to display a corresponding background image, and a semi-transparent mirror 230. As shown in FIG. 2, the first and second display panels 210 and 220 are arranged orthogonally with each other, and the semi-transparent mirror 230 is arranged to be inclined from the first or second display panels by an angle of about 45°. When a 3D image is to be displayed, the foreground image and the background image are displayed by the two display panels 210 and 220 simultaneously and then blended by the semi-transparent mirror 230 to form a 3D image which can be viewed by a viewer. The structure improves the light utilization ratio but its volume relatively large due to the arrangement of the components as shown in FIG. 2. In addition, the material cost is increased due to the usage of the semi-transparent mirror.

Figure 3:
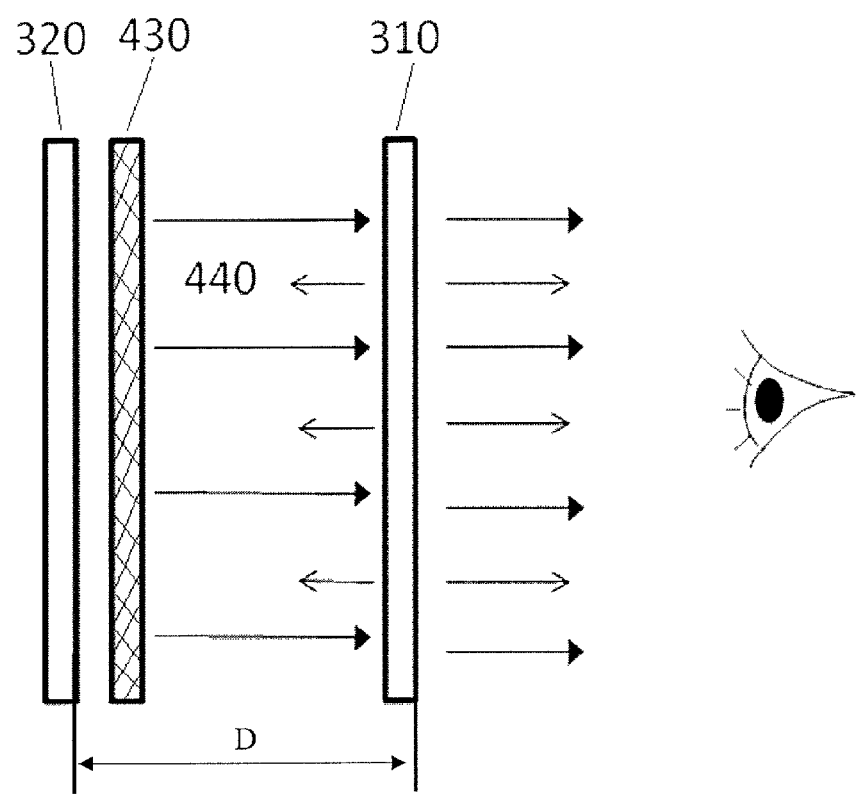
FIG. 3 is a structural schematic view of a DFD display device according to an embodiment of the disclosed technology.

As shown in FIG. 3, a Depth-Fused 3D (DFD) display device according to an embodiment of the disclosed technology comprises a first display panel 310 and a second display panel 320 which are provided in parallel with each other and with a field depth "D" therebetween. In an embodiment, the first display panel 310 is a transparent organic light-emitting display (OLED) panel and used to display a foreground image, and the second display panel 320 is another OLED panel and used to display a background image. The second display panel 310 has at least one light-emitting surface which faces the first display panel 310. In addition, a circular polarizer 430 is provided between the first display panel 310 and the second display panel 320, and a forward direction of the circular polarizer 430 coincides with a direction from the first display panel 310 to the second display panel 320.

A circular polarizer has a forward direction and a backward direction. When non-polarized light is incident on the circular polarizer and passes therethrough along the forward direction, it is converted into circularly polarized light; on the other hand, if light is incident on the circular polarizer along the backward direction, right circularly polarized light cannot pass a left circularly polarizer and left circularly polarized light cannot pass a right circularly polarizer, thus circular polarizers can be used to detect whether the light is circularly polarized light. The specific structure and detailed operation principle of the circular polarizer will be described later.

The first display panel 310 used for displaying the foreground image is a transparent panel so that the image light emitted by the second display panel 320 can pass through the circular polarizer 430 and the first display panel 310 and be viewed by a viewer in front of the display device. Each of the first and second display panels 310 and 320 comprises a plurality of pixels (not shown), the pixels of the first display panel and the pixels of the second display panels correspond to each other in a one-to-one relationship. The foreground image displayed by the first display panel 310 and the background image displayed by the second display panel 320 correspond to each other. The field depth D is set so that the images (the foreground image and the background image) from the first and second display panels 310 and 320 can be blended into a 3D image by the human eyes.

The organic light-emitting display panel according to the embodiment of the disclosed technology is a kind of self-luminescence display panel. For example, the transparent organic light-emitting display panel comprises a transparent substrate, transparent electrodes and transparent thin film transistor (TFT) array, and this panel can emit light from its two main surfaces and also allow light to pass therethrough. In the embodiments of the disclosed technology, any kinds of transparent organic light-emitting display can be used. In order to increase the light utilization ratio, in one embodiment, the second display panel can employ a reflective OLED panel. In one embodiment, the light emitted from the light emitting layer in the reflective OLED panel is reflected by a reflective layer (or a reflective electrode) and emitted from one surface of the panel. However, the disclosed technology is not limited thereto; for example, a transparent OLED panel can also be used as the second display panel, in which case the display device can have a two-sided displaying effect. Experiments on samples show that the light transmissivity of the transparent organic light-emitting display panel can reach up to 30% or more.

Figure 4:
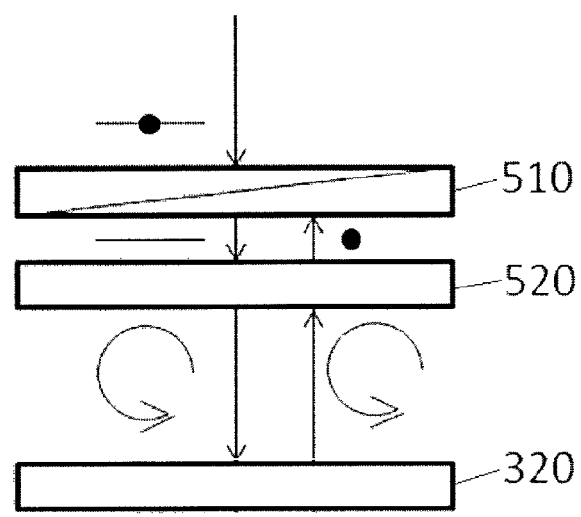
FIG. 4 is a schematic diagram for illustrating how a circular polarizer prevents light reflection according to the embodiments of the disclosed technology.

As shown in FIG. 3, the function of the circular polarizer 430 provided between the first display panel 310 and the second display panel 320 is blocking the light, which is emitted from the back side of the first display panel 310 (e.g., a transparent OLED panel) and then reflected back by the second display panel 320 (e.g., a reflective OLED panel), so as to avoid the disadvantageous interference on the stereoscopic display by the reflected light. As shown in FIG. 4, the circular polarizer 430 comprises a linear polarization sheet 510 and a quarter-wave plate 520 which are bonded with each other; the quarter-wave plate 520 is provided between the linear polarization sheet 510 and the second display panel 320. The optical axis of the quarter-wave plate 520 has an angle of 45° with respect to the polarization direction of the linear polarization sheet 510. A direction along which light is incident on the side of the linear polarization sheet 510 refers to the forward direction of the circular polarizer, and a direction along which light is incident on the side of the quarter-wave plate of the circular polarizer refers to the backward direction. The appearance of the circular polarizer takes on a grey state. The circular polarizer 430 may be provided as an individual component which is arranged between the first and second display panels 310 and 320 (as shown in FIG. 3). In another example, the circular polarizer 430 may be a film type circular polarizer which is attached onto a side of the second display panel 320 facing the first display panel 310.

Hereinafter, the operation principle of the circular polarizer will be described in detail. As for the circular polarizer 430, its forward direction is along the direction from the first display panel 310 to the second display panel 320; accordingly, the backward direction of the circular polarizer is along the direction from the second display panel 320 to the first display panel 310. In this case, the light 440 which is emitted from the back side of the first display panel 310 is incident onto the circular polarizer 430 on the side of the linear polarization sheet 510. After the light 440 passes through the linear polarizer 510, it is converted into linearly polarized light, and then converted into circularly polarized light after passing through the quarter-wave plate 520. Then the circularly polarized light is reflected back to the circular polarizer 430 by the second display panel 320 and substantially keeps its circular polarization state without change. After the reflected circularly polarized light passes through the quarter-wave plate 520, it is converted into linearly polarized light with a polarization direction which is just perpendicular to the polarization direction of the linear polarization sheet 510. Thus, the reflected polarized light is blocked by the linear polarization sheet 510 and can not be reflected back to the first display panel. Meanwhile, the circular polarizer 430 can not block the non-polarized light emitted from the second display panel 320 towards the first display panel 310. Therefore, the image light emitted from the second display panel 320 can pass through the circular polarizer, and further passes through the first display panel 310 to display the background image.

Based on the above description, two embodiments are given in order to further illustrating the disclosed technology, and the repeated description is omitted.

First Embodiment

According to this embodiment, the first display panel 310 is a transparent organic light-emitting display panel and used to display a foreground image, and the second display panel 320 is a reflective organic light-emitting display panel and used to display a corresponding background image. In addition, a circular polarizer 430 is disposed between the first display panel 310 and the second display panel 320. In this embodiment of the disclosed technology, the light-emitting surface of the second display panel 320 faces the first display panel 310. Since the first display panel 310 is a transparent display panel, it can be work as a piece of transparent glass with a certain light transmissivity. Therefore, during the stereoscopic displaying, the first and second display panels 310 and 320 can display the corresponding front and background images simultaneously without interference, and the images can be viewed by a viewer in front of the display device. In such a case, no synchronization controller is needed between the first display panel and the second display panel, which simplifies the device structure and avoids problems of displaying effect due to malfunction of the synchronization controller. In addition, since the light transmissivity of the transparent organic light-emitting display panel is high, the light utilization ratio of the 3D display device is greatly improved. Further, since the images can be displayed by the two display panels simultaneously and viewed by the viewer before the display device, the display panels are not necessary to operate in a time-division manner, which can improve the displaying effect.

Second Embodiment

The second embodiment of the disclosed technology provides another Depth-Fused 3D (DFD) display device. Except the second display panel, the DFD display device according to the second embodiment is substantially the same as that in the first embodiment. The same components are described with the same terms and referred by the same reference numbers, and the repeated description omitted here. The first display 310 is a transparent OLED panel, and the second display panel 320 is also a transparent OLED panel. A circular polarizer 430 is provided between the first display panel 310 and the second display panel 320, and the circular polarizer 430 comprises a linear polarization sheet 510 and a quarter-wave plate 520, which are sequentially stacked together. The linear polarization 510 is arranged on the side of the circular polarizer closer to the first display panel. When the second display panel 320 is a transparent organic luminescence panel, a two-sided displaying effect can be achieved.

The disclosed technology is described as above by referring to the embodiments. The field depth "D" between the two display panels can be determined by any known method so as to display a stereoscopic image. In the above embodiments, the second display panel 320 is a reflective organic light-emitting display panel or a transparent organic light-emitting display panel; however, the disclosed technology is not limited thereto. Any other display panel being able to emitting non-polarized image light can also be used as the second display panel, for example, plasma display panel, cathode ray tube display panel, or the like.

When the DFD display panels according to the embodiments of the disclosed technology use two display panels which are OLED panels, the first display panel is a transparent OLED panel and used to display a foreground image, and the first and second display panels can simultaneously display their own images without interference therebetween. Organic light-emitting display panels are self-emitting panels which need no back light unit. Thus, the backlight unit and synchronization controller in the conventional stereoscopic display panel are omitted so that the structure of the display device is simplified and degraded display due to malfunction of the synchronization controller can be avoided while the light utilization ratio is increased.

It should be noted that the above embodiments only have the purpose of illustrating the disclosed technology, but not limiting it. Although the disclosed technology has been described with reference to the above embodiment, those skilled in the art should understand that modifications or alternations can be made to the solution or the technical feature in the described embodiments without departing from the spirit and scope of the disclosed technology.

What is claimed is:

1. A depth-fused 3D display device, comprising: a first display panel and a second display panel which are provided in parallel with each other and separated with a field depth in between,
    wherein the first display panel configured for displaying a 2D foreground image of a 3D image comprises a transparent organic light-emitting display panel, the second display panel configured for displaying a 2D background image of the 3D image comprises a transparent organic light-emitting display panel,
    a circular polarizer is provided between the first display panel and the second display panel and comprises a complete piece of circular polarizer,
    the first display panel is configured to emit light towards both its front side and its back side, and
    wherein the first display panel and the second display panel are configured to display images simultaneously.

2. The depth-fused 3D display device of claim 1, wherein the circular polarizer comprises a linear polarization sheet and a quarter-wave plate which are sequentially stacked with each other, and the quarter-wave plate is located between the linear polarizer and the second display panel.

3. The depth-fused 3D display device of claim 1, wherein the circular polarizer is a film type circular polarizer and is attached onto a side of the second display panel close to the first display panel.

* * * * *